Patented May 12, 1931

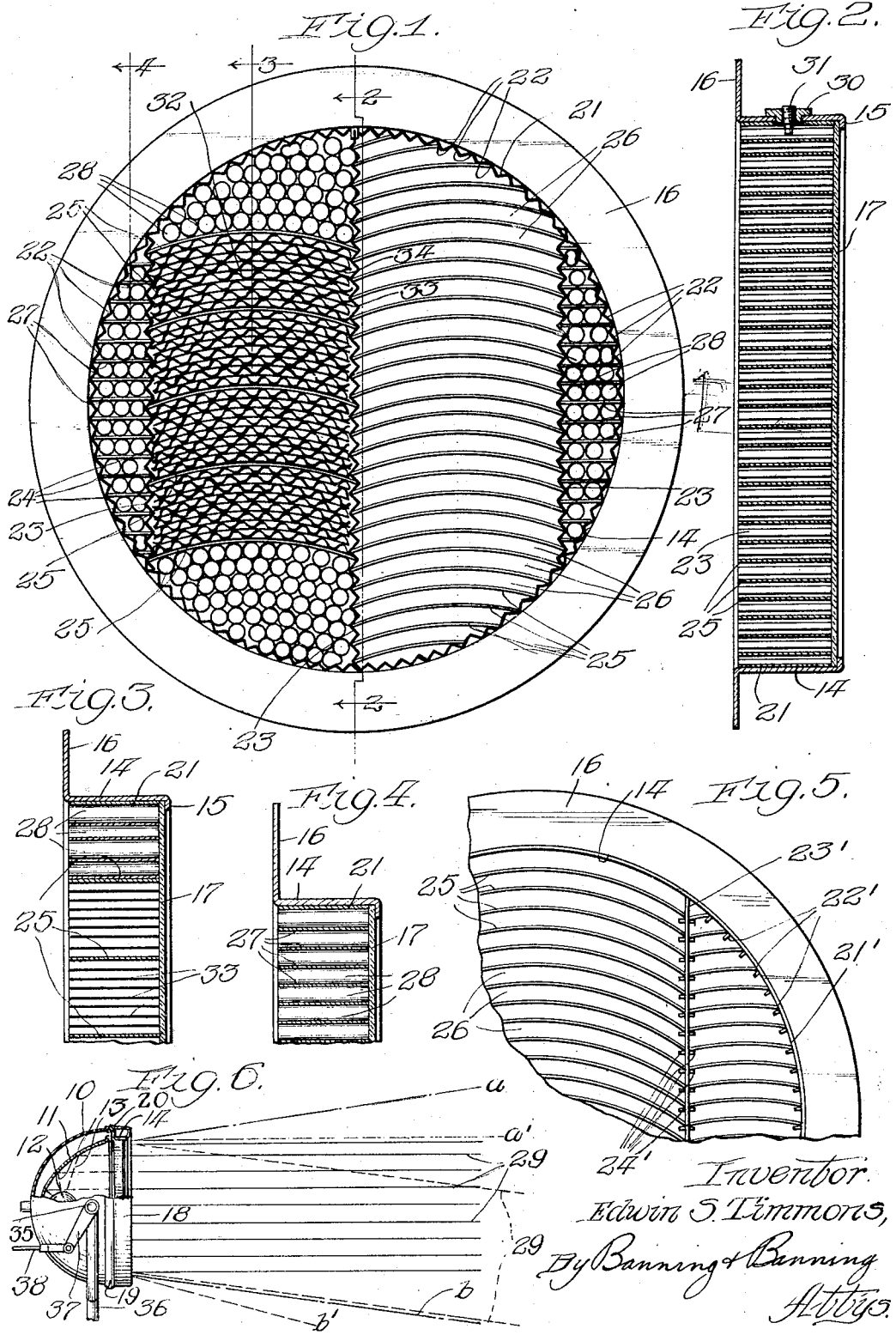

1,804,719

UNITED STATES PATENT OFFICE

EDWIN S. TIMMONS, OF CHICAGO, ILLINOIS

VEHICLE LIGHT DIRECTOR

Application filed October 17, 1929. Serial No. 400,206.

This invention relates to illuminating devices, and more particularly to vehicle headlight directors, although certain features thereof may be employed with equal advantages for other purposes.

It contemplates more especially the provision of means for effecting proper light distribution to illuminate the roadway in advance of vehicle travel with minimum annoyance to the aproaching driving vision.

Numerous devices have heretofore been proposed for controlling light emanation from vehicle headlights, but these have not proven entirely satisfactory for their intended purpose owing to the fact that the heretofore sought dimming and elimination of light diffusion are not conducive to proper roadway illumination.

Moreover, uncontrolled light emanation from the vehicle headlight creates an illuminated field of such expanse, limited throw and direction as to preclude driving with safety on dark thoroughfares, and further, the oncoming vehicle drivers are menaced by the rays appearing above the line of driving vision.

Controlled ray emanation along predetermined lanes below the line of driving vision is productive of a well defined illuminated area in advance of the vehicle without annoying and proving troublesome to oncoming drivers. This is effected by light ray direction rather than refraction, reflection, or dimming to the end of shading the field above the line of driving vision.

One object of the present invention is to simplify the construction and improve the operation of devices of the character mentioned.

Another object is the provision of means for directing rays from a vehicle headlight along predetermined lanes below the line of driving vision.

Still another object is the provision of means for controlling light emanation to effect the undimmed distribution thereof below the line of driving vision.

A further object is to provide a vehicle headlight with a series of tubular light directing channels effective to control ray distribution along predetermined lanes of travel.

A still further object is to provide a headlight with corrugated confronting walls to enable the detachable association of light ray directors therewith.

Still a further object is to provide a casing with corrugated confronting surfaces to enable the tensioned detachable association of ray directors therewith.

Other objects and advantages will appear from the following description of an illustrative embodiment of the present invention.

In the drawing:

Figure 1 is a front view in elevation of a device embodying features of the present invention;

Fig. 2 is a sectional view taken substantially along line 2—2 of Fig. 1;

Fig. 3 is a sectional view taken substantially along line 3 of Fig. 1;

Fig. 4 is a sectional view taken substantially along line 4 of Fig. 1;

Fig. 5 is a fragmentary detail view of a modified form of the device, and

Fig. 6 is a fragmentary elevational view partly in section of a headlight embodying features of the present invention.

Referring to the drawing, the structure selected for illustration is shown in association with a vehicle lamp casing 10 of standard construction, these being customarily employed as headlights for motor vehicles, although the invention may be advantageously used for other purposes. The headlight 10 has a parabolical reflector 11 disposed therein to axially support a standard socket which telescopically receives a bulb 12, thereby establishing a connection with a source of electrical energy in the usual manner.

The lateral and rearward light rays 13 emanating from the body of the bulb 12 impinge against the reflector 11 in a manner to effect increased illumination forward of the vehicle headlight 10. These are reflected above and below the line of driving vision together with the direct light rays emanating from the bulb 12 to create a glare which blinds the approaching drivers of vehicles traveling in the opposite direction.

The present invention proposes to overcome the defects and detrimental effect of accentuated light above the line of driving vision by partially or entirely precluding ray emanation in a direction responsible for a troublesome interference with the driving vision. The preferred embodiment thereof comprises a circular band or casing 14 which has oppositely directed peripheral flanges 15 and 16. The flange 15 serves to retain a transparent lens 17 in position within the confines of the rim 14 while the flange 16 is adapted to rest against the parabolic reflector 11 for retention in position in this instance by a rim 18 which is beaded as at 19 to yieldingly grasp a correspondingly shaped ridge 20 formed on the headlight shell 10.

In order to retain the ray directors in position the interior of the band 14 is, in this instance, integrally or otherwise, provided with a corrugated lining or surface 21 which presents a horizontally aligned series of V-shaped troughs 22. Vertically extending partition members 23, in this instance three, are disposed within the band 14 in spaced relation, these being corrugated or otherwise notched to provide plate receiving means 24 in confronting relation with corresponding attaching expedients in the band lining or surface 21.

Any suitable light ray directors such as a closely associated series of bowed rectangular plates 25, are sprung or otherwise deformed into aligned troughs 22 and 24 between the band 14 and/or partition members 23, thereby defining channels 26 for controlling light ray emanation therethrough. As shown, the end partition members 23 are suitably braced against deflection by means of rigid plates 27 which withstand the stresses incident to retaining the plates 25 in position; however, plates 25 may be disposed between the braces 27 to define proper ray directing lanes 26.

It is to be noted that the bowed plates 25 may be utilized with less frequency, and adjacently disposed elongated tubes 28 be confined therebetween to direct the light rays along predetermined lanes below the driving vision. The plates 25 and/or tubes 28 may be of any suitable material, and so associated as to be independent or adhesively secured as commercial practice may dictate.

In order to adjust the partition members 23 and remove any possible slack therein, nuts 30 are mounted on the casing 14 to receive screws 31 carried by the upper ends of said partitions. Any other suitable tensioning or adjusting means may be resorted to as commercial practice may dictate. The lower ends of the partitions 23 are connected to the lining 21 in any suitable way, for example by soldering.

As shown in the left hand side of Fig. 1, it is preferred to employ tubes 28 in the uppermost and lowermost compartments formed by the plates 25. In the intermediate compartments I prefer to employ ray directors constituted by strips of material 32, each strip comprising a plain layer 33 and a corrugated layer 34 attached thereto.

It is to be understood that any of the types of ray director which I have described may be employed throughout or that any two or more of them may be combined in a single headlight.

In the modification of the invention shown in Fig. 5, the circular casing 14 envelopes an interior cylindrical lining band 21' which carries the ray directors.

Rectangular stricts 23', suitably two in number, serve as vertical partition members. The partition members 23' are disposed within the casing 14 in spaced vertical parallelism, these being provided with oppositely directed tangs 24' constituting plate receiving and supporting means in confronting aligned relation with corresponding attaching or plate seating expedients 22' in the interior casing surface 21'. Said tangs may suitably be struck up from the metal of the partitions 23' and the band 21'.

Suitable light ray directors such as a closely associated series of bowed rectangular plates 25 are sprung or otherwise held against aligned tangs 24' between the band 21' and/or partition members 23' thereby defining a series of channels 26 for controlling light emanation therethrough. It is to be noted that the curvature of the casing 14 presents critical angles of repose for the edges of the plates 25 thereby requiring certain plate edges to be disposed above and below the tangs 24' depending upon the position thereof with respect to the horizontal diameter of the casing 14', otherwise the plates 25 would slip, thereby rendering it impossible to maintain a true parallel relationship therebetween.

Means are preferably provided whereby the headlight may be rotated, to a certain extent, in a vertical plane. Thus, as shown in Fig. 6, the casing 10 may be mounted by means of trunnions 35 which are engaged by forks 36. Upon one trunnion is mounted a crank 37 which is provided with a link 38 whereby the position of the headlight may be changed. Said links 38 may, for example, be connected to suitable control mechanism (not shown) within the reach of the driver so that the headlights may be directed downwardly when meeting oncoming traffic. If desired, the links 38 may be made fast in any suitable way to maintain the headlights in a desired fixed adjustment.

The light from the improved headlight comprises a beam of substantially parallel rays 29. Around said beam is a diverging annular band of light of lesser intensity, the upper and lower limits of which are designated by the dotted line a and b. While this diffused light is less intense than the diverging light from the headlights in use, the upwardly directed portion thereof is capable of producing a certain amount of glare when viewed by oncoming drivers. It will readily be understood that the headlight may be tipped, either permanently or temporarily in the manner described so as to bring the upper limit a of the diffused light into the horizontal position a' and consequently prevent all glare.

While the invention has been described in connection with the details of specific embodiments therefor, it is to be understood that such details are not intended to be limitative of the invention except insofar as set forth in the accompanying claims.

I claim:

1. In a device of the character described, the combination with a casing, of vertically extending partition members in said casing, a series of plates disposed in parallelism in said casing, and plate edge receiving means on confronting surfaces of said casing and partition members to enable the deformed association of said plates therewith, said plates extending axially through said casing to direct the light rays along predetermined paths.

2. In a device of the character described, the combination with a casing, of vertically extending partition members in said casing, a series of plates disposed in parallelism in said casing, and corrugations on confronting surfaces of said casing and partition members to enable the deformed association of said plates therewith, said plates extending axially through said casing to direct the light rays along predetermined paths.

3. In a device of the character described, the combination with a casing, of vertically extending partition members in said casing, a series of plates disposed in parallelism in said casing, and corrugations on confronting surfaces of said casing and partition members to enable the compressed association of said plates therewith, said plates extending axially through said casing to direct the light rays along predetermined paths, and means for adjusting the tension of said partition members.

4. In a light director, the combination with a casing, of a corrugated wall constituting the interior of said casing, a transparent shield enclosing one side of said casing to serve as a lens, partition members in said casing, corrugations impressed in said partition members in alignment with the corrugations in said casing wall, said corrugations being in axial alignment with the light rays, and flexible plates sprung between said corrugations and casing wall for registry with the aligned corrugations therein.

5. In a device of the character described, the combination with a casing, of partition members in said casing, aligned plate holding means provided in the confronting walls of said casing and partition members, and a series of plates disposed in parallelism between said casing and partition members for retention in position by said plate holding means, said plates extending in an axial direction through said casing, and elongated members between said plates defining openings parallel to said plates to direct the light rays along predetermined paths.

6. In a device of the character described, the combination with an automobile headlight, light directing means at the front end of said headlight, comprising vertically disposed partition members extending across the inside area of said casing, plate edge receiving means on the confronting surfaces of said casing and said partition members, and a series of thin plates bowed for registry with said edge receiving means and held thereby in spaced and parallel relation with each other and parallel to the course of the light rays, said thin plates being provided throughout the spaces between said partition members and said casing and partition members.

7. In a device of the character described, a casing, vertically extending partition members in said casing, said members having projections, and bowed plates sprung between said partition members and held in place by said projections.

8. In a device of the character described, a casing, vertically extending partition members in said casing, and bowed plates sprung between said partition members, said plates and members having interengaging means for retaining them in assembled relation.

In testimony whereof, I have hereunto set my hand this 12th day of October, 1929.

EDWIN S. TIMMONS.